(12) United States Patent
Liu et al.

(10) Patent No.: US 12,372,154 B2
(45) Date of Patent: Jul. 29, 2025

(54) SEALING DEVICE OF A BEARING AND BEARING

(71) Applicant: Schaeffler Technologies AG & Co. KG, Herzogenaurach (DE)

(72) Inventors: Xin Liu, Shanghai (CN); Lijuan Wu, Suzhou (CN); Yu Tang, Shanghai (CN); Jia Fan, Jiangsu Province (CN); Chunliang Huang, Suzhou SIP (CN); Jianfei Wei, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 233 days.

(21) Appl. No.: 18/031,967

(22) PCT Filed: Oct. 16, 2020

(86) PCT No.: PCT/CN2020/121369
§ 371 (c)(1),
(2) Date: Apr. 14, 2023

(87) PCT Pub. No.: WO2022/077412
PCT Pub. Date: Apr. 21, 2022

(65) Prior Publication Data
US 2023/0392649 A1    Dec. 7, 2023

(51) Int. Cl.
*F16C 33/78* (2006.01)
*F16J 15/32* (2016.01)
(Continued)

(52) U.S. Cl.
CPC ....... *F16J 15/3208* (2013.01); *F16C 33/7823* (2013.01); *F16C 33/7876* (2013.01);
(Continued)

(58) Field of Classification Search
CPC ................ F16C 33/782; F16C 33/7823; F16C 33/7876; F16C 33/7889; F16J 15/3208; F16J 15/3212; F16J 15/322
See application file for complete search history.

(56) References Cited

U.S. PATENT DOCUMENTS

| | | | |
|---|---|---|---|
| 2,249,141 A * | 7/1941 | Johnson | ............... F16J 15/3212 277/575 |
| 4,531,747 A | 7/1985 | Miura | |

(Continued)

FOREIGN PATENT DOCUMENTS

| CN | 202834078 U | 3/2013 |
|---|---|---|
| CN | 203023491 | 6/2013 |

(Continued)

OTHER PUBLICATIONS

Machine Translation of WO-2009143972-A1 (Year: 2009).*
(Continued)

*Primary Examiner* — Alan B Waits
(74) *Attorney, Agent, or Firm* — Volpe Koenig

(57) ABSTRACT

A sealing device of a bearing. The sealing device includes a framework, a sealing component and a plurality of elastic members, wherein the framework and the sealing component are both annular and connected to each other, and the framework is configured to be fixed to a first ring of a bearing. The sealing component is configured to abut against a second ring of the bearing the plurality of elastic members are distributed at intervals in the circumferential direction of the sealing component, and the elastic members are used for applying an elastic force to the sealing component such that the sealing component is pressed against the second ring. A bearing is also provided.

20 Claims, 8 Drawing Sheets

(51) Int. Cl.
*F16J 15/3208* (2016.01)
*F16J 15/3212* (2016.01)

(52) U.S. Cl.
CPC ....... *F16C 33/7889* (2013.01); *F16J 15/3212* (2013.01); *F16C 2300/14* (2013.01); *F16C 2360/31* (2013.01)

(56) References Cited

U.S. PATENT DOCUMENTS

| | | | | |
|---|---|---|---|---|
| 6,050,570 | A * | 4/2000 | Otto | F16J 15/3244 |
| | | | | 277/560 |
| 2010/0322544 | A1* | 12/2010 | Hubbard | F16C 33/7853 |
| | | | | 384/486 |
| 2021/0396217 | A1* | 12/2021 | Hansen | F16J 15/3212 |

FOREIGN PATENT DOCUMENTS

| | | | | |
|---|---|---|---|---|
| CN | 203939998 | | 11/2014 | |
| CN | 204592290 | | 8/2015 | |
| CN | 205064594 | | 3/2016 | |
| CN | 108533619 A | * | 9/2018 | |
| CN | 110259949 | | 9/2019 | |
| CN | 110762218 | | 2/2020 | |
| CN | 110762218 A | * | 2/2020 | ........... F16J 15/3212 |
| DE | 202008017339 U1 | | 10/2009 | |
| DE | 202017101822 U1 | | 5/2017 | |
| GB | 2562205 A | | 11/2018 | |
| JP | 2018135927 | | 8/2018 | |
| WO | WO-2009143972 A1 | * | 12/2009 | .............. F16C 33/78 |
| WO | 2018167488 A1 | | 9/2018 | |

OTHER PUBLICATIONS

Machine Translation of CN-108533619-A (Year: 2018).*
Machine Translation of CN-110762218-A (Year: 2020).*
Chinese Office Action for corresponding Chinese Application No. 202080101824.1 dated Mar. 26, 2025, 7 pages.

* cited by examiner

SEALING DEVICE OF A BEARING AND BEARING

CROSS-REFERENCE TO RELATED APPLICATIONS

This application is the U.S. National Phase of PCT Appln. No. PCT/CN2021/121369, filed Oct. 16, 2020, the entire disclosure of which is incorporated by reference herein.

TECHNICAL FIELD

The present disclosure relates to the field of bearings, in particular to a sealing device for a bearing.

BACKGROUND

FIG. 1 shows a possible sealing device S of a bearing. The sealing device S is annular and is sleeved between an outer ring B1 and an inner ring B2 of the bearing to avoid leakage of, for example, a lubricant on an inner side (a left side of the sealing device S in the figure) of the bearing, and meanwhile, to prevent foreign matters such as, for example, dust and water on an outer side (a right side of the sealing device S in the figure) of the bearing from entering the bearing.

The sealing device S comprises a framework S1, a sealing component S2 and a spring S3 which are all annular. The framework S1 is connected to the outer ring B1 in an interference fit manner, the sealing component S2 is attached to the framework S1, and a main lip S21 and an auxiliary lip S22 of the sealing component S2 both abut against the inner ring B2. The spring S3 is a spiral spring, and the spring is connected to the sealing component S2 and applies a force towards a radial inner side to the sealing component S2 such that the sealing component S2 (in particular, the main lip S21) is pressed against the inner ring B2.

A face, facing the inner ring B2 and the inner side of the bearing, of the main lip S21 is an inclined surface f. Under the circumstance that the lubricant (in particular, the lubricant adhering to a peripheral wall of the inner ring B2) on the inner side of the bearing splashes along with the rotation of the bearing, the lubricant flying to the inclined surface f will be blocked by the inclined surface f and be pumped towards the inner side of the bearing. Particularly in the high-speed running process of the bearing, the inclined surface f plays a role in pumping the lubricant that may leak to the inner side of the bearing.

However, the sealing function of the above-mentioned sealing device S is not ideal in performance for, for example, a bearing with a relatively low rotating speed, or a bearing with a large diameter (such as a bearing of a wind power generator).

For example, for the bearing with the relatively low rotating speed, the lubricant is easily accumulated on an outer circumference of the inner ring B2 instead of splashing; and for part of the splashed lubricant, only a small part will just fly to the inclined surface f and be further pumped to the inner side of the bearing by the inclined surface f. In this case, the lubricant tends to accumulate at the position of the main lip S21 to cause leakage.

For another example, for a bearing with a large diameter (for example, the diameter of a main shaft bearing of a wind power generator is greater than 1 meter, and can reach several meters), the sealing device S will be subject to a large centrifugal force during rotation due to the excessively large diameter, which is unfavorable for the main lip S21 to abut against the inner ring B2 tightly. On the other hand, when the diameter of the sealing device S becomes larger and the dead weight increases, a radial force of the spring S3 will be unevenly distributed in the circumferential direction, resulting in that a proper structural size is difficult to calculate and the spring S3 with a proper structural size is difficult to design.

SUMMARY

An objective of the present disclosure is to provide a sealing device with a good sealing effect so as to overcome or at least alleviate the defects in the prior art.

According to a first aspect of the present disclosure, a sealing device of a bearing is provided, comprising a framework, a sealing component and a plurality of elastic members, wherein the framework and the sealing component are both annular and connected to each other. The framework is configured to be fixed to a first ring of the bearing. The sealing component is configured to abut against a second ring of the bearing, wherein
the plurality of elastic members are distributed at intervals in a circumferential direction of the sealing component, and the elastic members are used for applying an elastic force to the sealing component such that the sealing component is pressed against the second ring.

In at least one embodiment, the elastic members are C-shaped.

In at least one embodiment, a making material of the framework comprises fabric.

In at least one embodiment, a making material of the sealing component comprises rubber.

In at least one embodiment, the sealing component and the elastic members are connected together by a vulcanization process.

In at least one embodiment, several through holes are formed on the elastic members, and the sealing component partially passes through the through holes.

In at least one embodiment, several positioning holes are formed on the elastic members, and the positioning holes are used to cooperate with positioning devices on a mold to help to determine circumferential positions of the elastic members on the sealing component.

In at least one embodiment, a face, for facing the second ring and an inner side area of the bearing, of the sealing component is partially recessed towards an outer side of the sealing device to form a plurality of oil-pumping grooves, and the plurality of oil-pumping grooves are distributed in the circumferential direction of the sealing component.

In at least one embodiment, the more toward an inner side of the bearing, the larger openings of the oil-pumping grooves are.

In at least one embodiment, the sealing component comprises a main lip and an auxiliary lip; the main lip inclines towards one side in an axial direction of the sealing component; the auxiliary lip inclines towards the other side in the axial direction; the main lip is used to face the inner side of the bearing; and the auxiliary lip is used to face an outer side of the bearing.

In at least one embodiment, the main lip is used to be in contact with the second ring.

In at least one embodiment, the sealing device further comprises an additional lip; the additional lip is used to face the outer side of the bearing and is in contact with the second ring; and a making material of the additional lip has air permeability.

In at least one embodiment, the auxiliary lip is further provided with an additional lip, the additional lip is used to be in contact with the second ring, and a making material of the additional lip comprises felt.

In at least one embodiment, an inner diameter of the framework is not less than 1 m.

According to a second aspect of the present disclosure, a bearing is provided, comprising a first ring and a second ring that are nested with each other and are rotatable relative to each other, characterized in that, the bearing further comprises the sealing device according to the present disclosure.

In at least one embodiment, the bearing is a main shaft bearing of a wind power generator.

The sealing device according to the present disclosure can be suitable for bearings with larger diameters, and the sealing device has high reliability and good sealing effect.

DETAILED DESCRIPTION

Exemplary embodiments of the present disclosure will be described below with reference to the attached drawings. It should be understood that these specific descriptions are only used to teach those skilled in the art how to implement the present disclosure, and are neither intended to be exhaustive of all possible variations of the present disclosure nor to limit the scope of the present disclosure.

Figure 4:
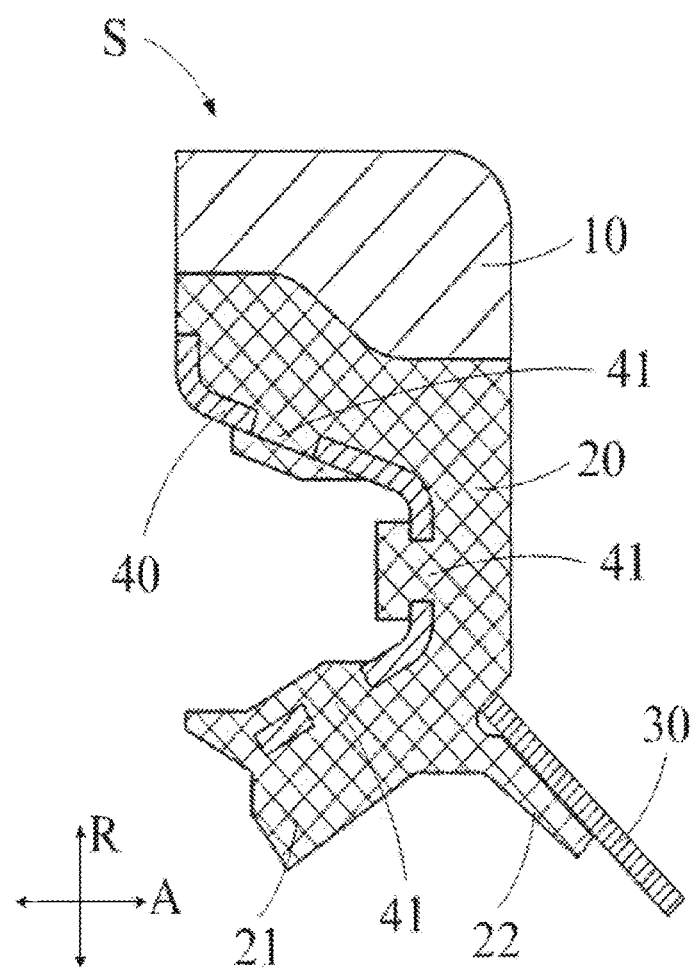
FIG. 4 is a half of a sectional view of the sealing device S according to the first embodiment of the present disclosure perpendicular to an axial direction.
Figure 9:
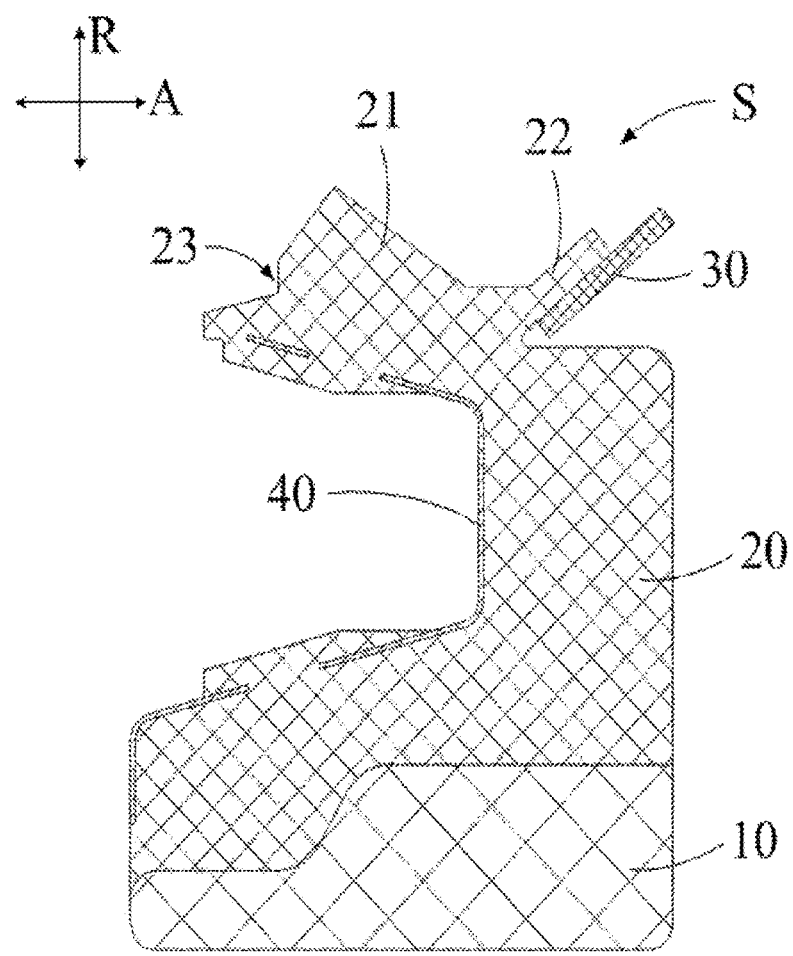
FIG. 9 is a half of a sectional view of the sealing device S according to the second embodiment of the present disclosure perpendicular to an axial direction.

Unless otherwise specified, referring to FIG. 4 and FIG. 9, A represents an axial direction of the sealing device S, and the axial direction A is consistent with an axial direction of a bearing; and R represents a radial direction of the sealing device S, and the radial direction R is consistent with a radial direction of the bearing.

Referring to FIG. 2 to FIG. 9, the sealing device S of the bearing according to the present disclosure is described.

First Embodiment

First, referring to FIG. 2 to FIG. 6, a sealing device S according to the first embodiment of the present disclosure is described.

Figure 1:
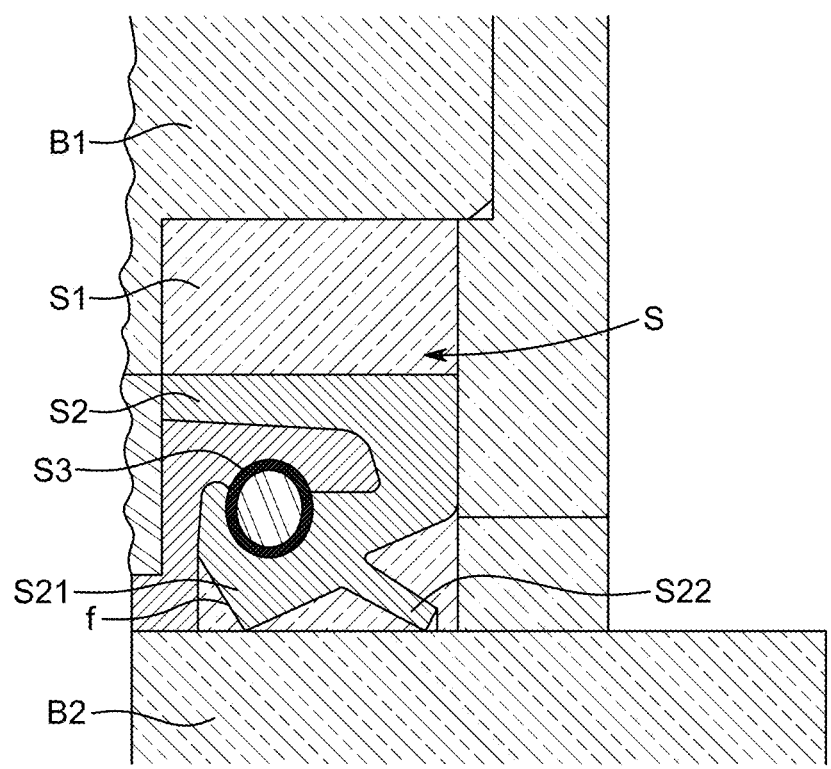
FIG. 1 shows a sectional view of a possible sealing device mounted on a bearing.
Figure 2:
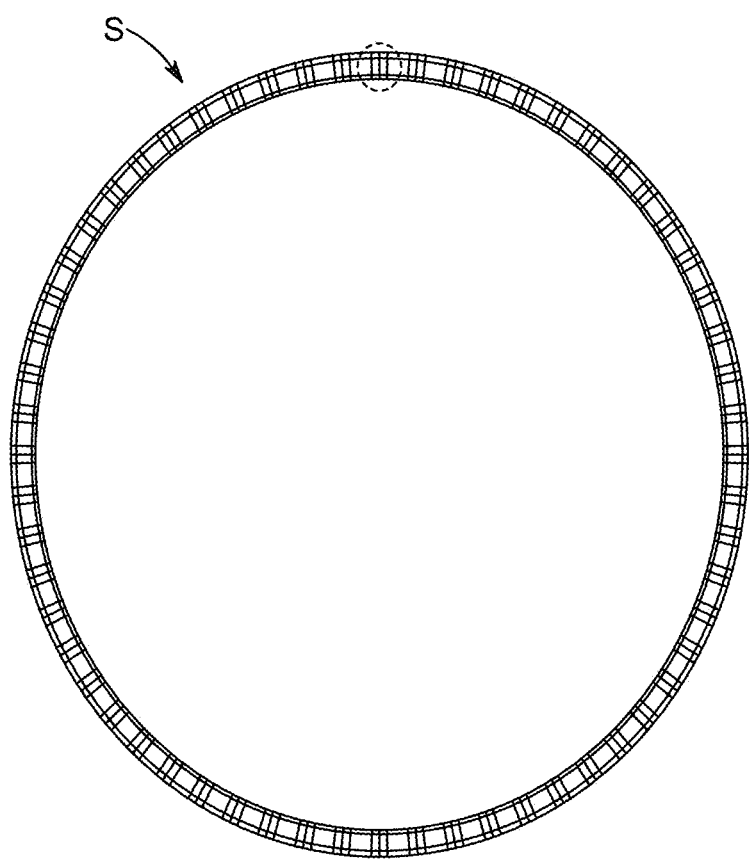
FIG. 2 is an axial schematic diagram of a sealing device S according to a first embodiment of the present disclosure.

As shown in FIG. 2, the sealing device S is annular.

Figure 3:
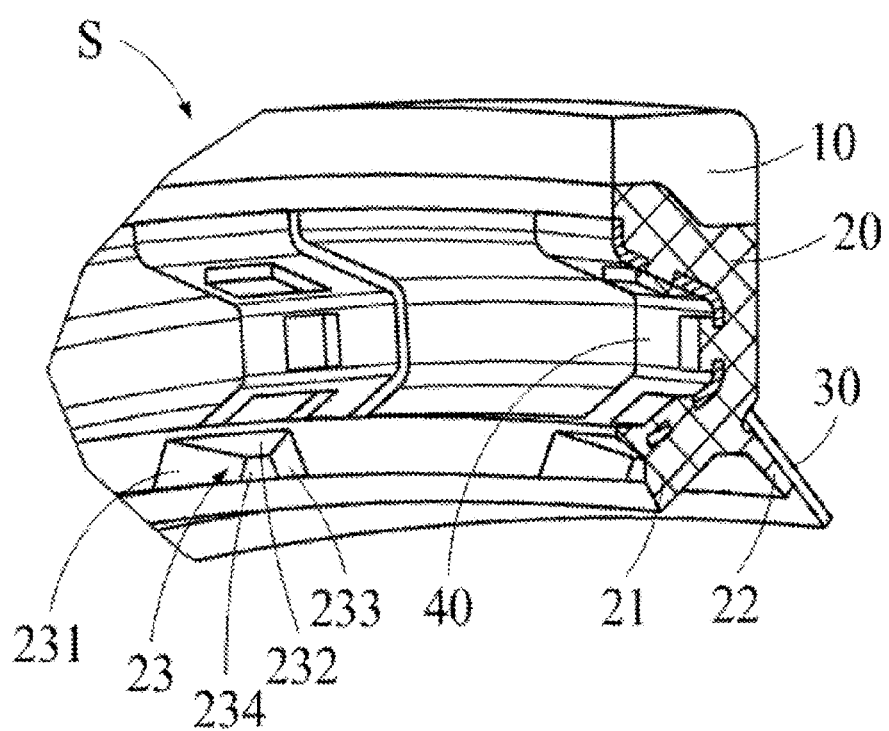
FIG. 3 is an enlarged three-dimensional schematic diagram of a circled part in FIG. 2.

Further referring to FIG. 3 and FIG. 4, the sealing device S comprises a framework 10, a sealing component 20, an additional lip 30 and elastic members 40 which are all annular.

In the present embodiment, the sealing component 20 is arranged on an inner peripheral side of the framework 10. The framework 10 is configured to be connected to an outer ring (also referred to as a first ring in the present embodiment) of a bearing in an interference fit manner, and the sealing component 20 is configured to abut against an inner ring (also referred to as a second ring in the present embodiment) of the bearing and is rotatable relative to the inner ring.

A making material of the framework 10 comprises fabric, for example, cotton or nylon. Therefore, the framework 10 has high flexibility, is easy to manufacture and low in cost and is easily assembled on the outer ring of the bearing. Such advantages are especially obvious for the framework 10 with a large diameter (for example, about 1 m or greater than 1 m).

A making material of the sealing component 20 is, for example, rubber. The sealing component 20 is connected to the framework 10 by, for example, a vulcanization process.

Taking the orientation shown in FIG. 4 as an example, a left side of the sealing device S in the figure is the inner side (that is, a lubricant side) of the bearing, and a right side of the sealing device S is the outer side (that is, an air side) of the bearing.

The sealing component 20 comprises a main lip 21 and an auxiliary lip 22. Relative to a plane perpendicular to an axial direction A, the main lip 21 inclines towards the inner side, and the auxiliary lip 22 inclines towards the outer side.

A plurality of elastic members 40 are provided, and the plurality of elastic members 40 are distributed uniformly in a circumferential direction of the sealing component 20.

The elastic members 40 are approximately C-shaped, and openings of C shapes approximately face the inner side of the bearing.

The elastic members 40 are partially connected to the main lip 21 to ensure that the elastic members 40 can apply a component force to the main lip 21 at least in a radial direction R under the circumstance that the sealing device S is mounted on the bearing, so that the main lip 21 is in tight contact with the inner ring.

Figure 5:
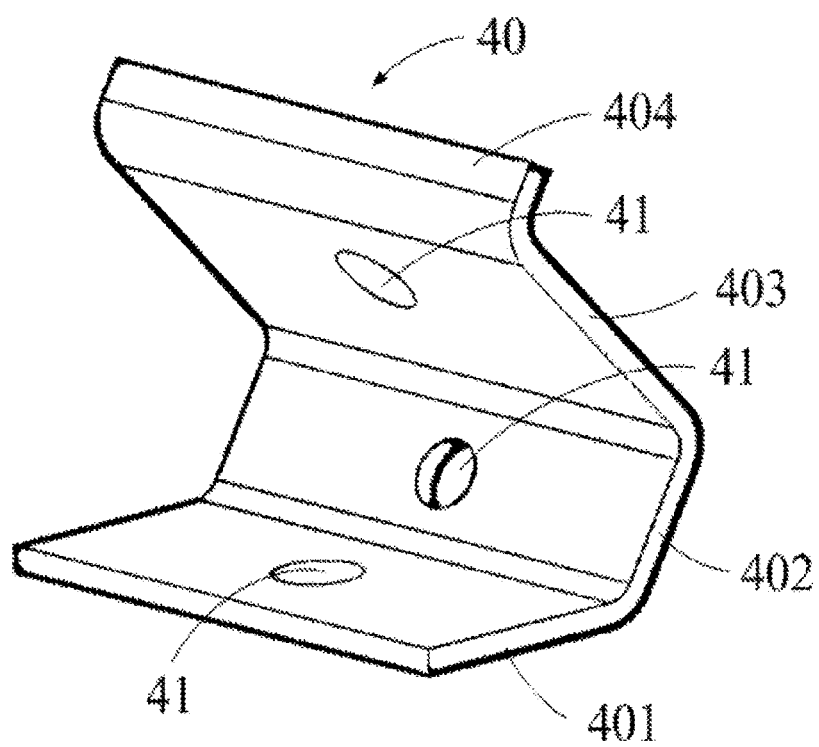
FIG. 5 is a schematic diagram of an elastic member 40 according to the first embodiment of the present disclosure.

Meanwhile, referring to FIG. 5, the elastic member 40 mainly comprises three sheet-like parts (a first bending sheet 401, a second bending sheet 402 and a third bending sheet 403) that are connected to each other and arranged obliquely to each other. Preferably, an end part, away from the second bending sheet 402, of the third bending sheet 403 is further connected to a fourth bending sheet 404; a bending direction of the fourth bending sheet 404 is opposite to an opening direction of the C-shaped elastic member 40; and the fourth bending sheet 404 extends towards the framework 10. A surface, facing the opening of the C shape, of the elastic member 40 substantially coincides with a surface, facing the inner side, of the sealing component 20.

Referring to FIG. 4 and FIG. 5, the first bending sheet 401 is bonded to the (axial) inner side of the main lip 21 and extends towards a radial outer side while extending towards an axial outer side. The second folding sheet 402 is bonded to a narrow part of a radial middle part of the sealing component 20, is located at an (axial) inner side of the narrow part, and extends substantially along a radial direction R. The third folding sheet 403 is bonded to a base part, connected to the framework 10, of the sealing component 20; and the third folding sheet 403 extends towards the radial outer side while extending towards the axial inner side. The first folding sheet 401 and the third folding sheet 403 face each other in the radial direction R, so that an elastic force facing the inner ring of the bearing can be applied to the main lip 21.

The elastic member 40 is provided with several (three in the present embodiment) through holes 41 (also referred to as rubber-overflowing holes). The elastic member 40 and the sealing component 20 are connected together by, for example, a vulcanization process. In the vulcanization process, semi-solid rubber can pass through the through holes 41 and partially wrap the elastic members 40, that is, it is shown that the sealing component 20 partially passes through the through holes 41, so that the elastic member 40 is connected to the sealing component 20 firmly.

Preferably, each of the first bending sheet 401, the second folding sheet 402 and the third folding sheet 403 is provided with at least one through hole 41.

The surface, facing the inner ring and the inner side of the bearing, of the main lip 21 is partially recessed towards the outer side to form a plurality of oil-pumping grooves 23. Preferably, the plurality oil-pumping grooves 23 are distributed uniformly in the circumferential direction of the sealing component 20.

Figure 6:
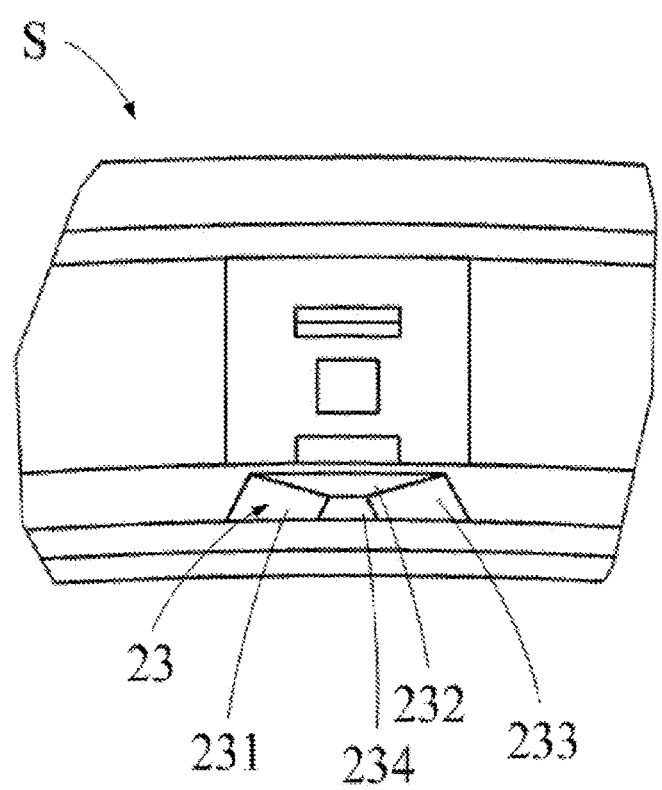
FIG. 6 is an enlarged schematic diagram of the circled part in FIG. 2.

In the present embodiment, referring to FIG. 3 and FIG. 6, the oil-pumping groove 23 comprises four inner surfaces to form a bellmouth shape (the more toward the inner side of the bearing, the larger an opening of the oil-pumping groove 23 is). The four inner surfaces are respectively a first face 231, a second face 232, a third face 233 and a fourth face 234. The fourth face 234 is located at the deepest part of the oil-pumping groove 23, and the fourth face 234 is substantially parallel to the surface perpendicular to the axial direction A. The first face 231 and the third face 233 are located on two sides of the fourth face 234 in a circumferential direction, and the second face 232 is located on a radial outer side of the fourth face 234 and connected to both the first face 231 and the third face 233.

By the above arrangement of the oil-pumping groove 23, splashed oil on the inner side can impact the inclined inner surfaces (mainly are the first face 231, the second face 232 and the third face 233) of the oil-pumping groove 23 with a high probability, thereby being pumped back by these inclined inner surfaces and being not easy to accumulate near the main lip 21, even leak to the outer side of the bearing.

It should be understood that the oil-pumping groove 23 is not limited to be composed of four inner surfaces, it may, for example, comprise more inclined inner surfaces, or the inner surfaces of the oil-pumping groove 23 may also comprise curved surfaces.

Continuously referring to FIG. 3 and FIG. 4, under the circumstance that the main lip 21 is in contact with the inner ring, the auxiliary lip 22 may or may not be in contact with the inner ring. Furthermore, when the auxiliary lip 22 is also in contact with the inner ring, the auxiliary lip 22 is in contact with the inner ring with a quite small radial force, and the radial force with which the auxiliary lip 22 abuts against the inner ring is smaller than a radial force with which the main lip 21 abuts against the inner ring.

An additional lip 30 is connected to the auxiliary lip 22. Preferably, the additional lip 30 is arranged on a surface, facing the outer side, of the auxiliary lip 22. Preferably, the additional lip 30 is connected to the auxiliary lip 22 in a gluing manner.

The additional lip 30 is made of a material with good air permeability. Preferably, a making material of the additional lip 30 comprises felt. Preferably, the additional lip 30 is in contact with the inner ring under the circumstance that the sealing device S is mounted on the bearing.

On a first aspect, the additional lip 30 plays a role in preventing foreign matters on the outer side from entering the inner side of the bearing; on a second aspect, the additional lip 30 plays a role in protecting the auxiliary lip 22, so that the auxiliary lip 22 may not be in direct contact with the external foreign matters and may not be in contact with the inner ring so as not to be easily worn, and the additional lip 30 made of felt has good toughness and is not easy to tear; and on a third aspect, the additional lip 30 can prevent, for example, water on the outer side from entering the inner side of the bearing, and meanwhile, the additional lip 30 does not limit the circulation of air, so that air pressures on two axial sides of the auxiliary lip 22 can be kept balanced or nearly balanced.

Second Embodiment

Figure 7:
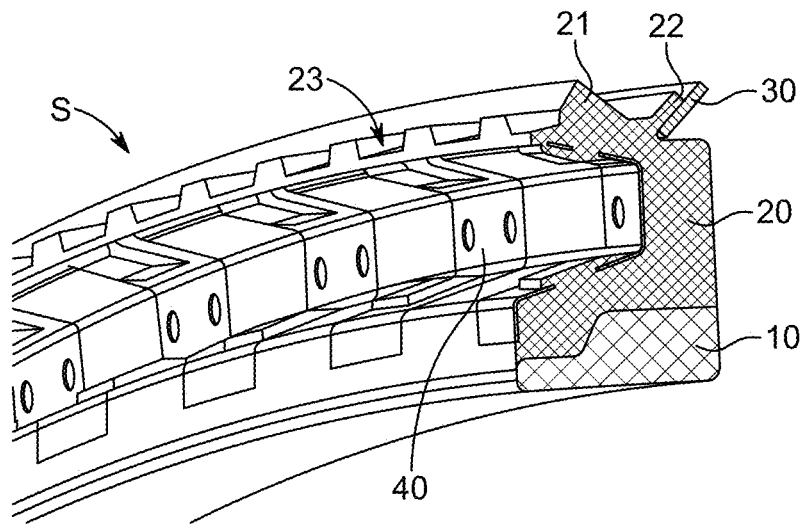
FIG. 7 is a schematic diagram of a partially sectioned sealing device S according to a second embodiment of the present disclosure.
Figure 8:
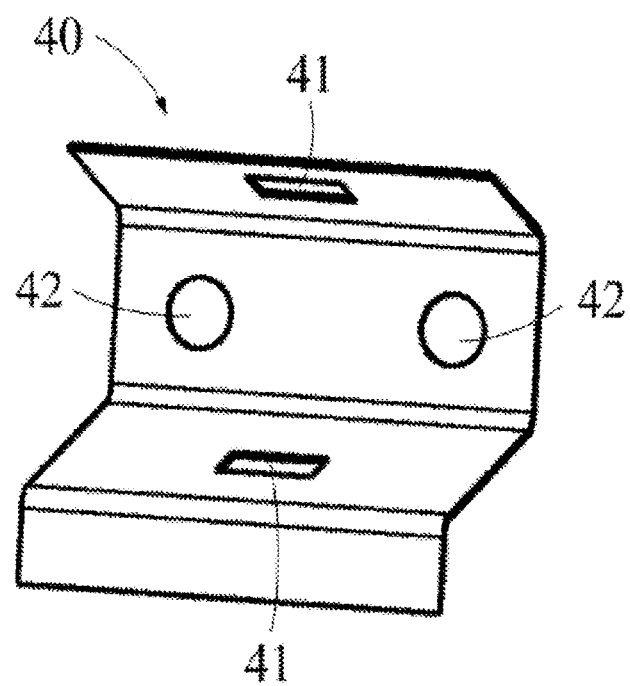
FIG. 8 is a schematic diagram of an elastic member 40 according to the second embodiment of the present disclosure.

The second embodiment according to the present disclosure is described below with reference to FIG. 7 to FIG. 9. Components having the same or similar structure or function as those in the first embodiment are denoted by the same reference numerals, and detailed descriptions of these components are omitted.

In the present embodiment, the sealing component 20 is arranged on an outer peripheral side of the framework 10. The framework 10 is configured to be connected to an inner ring (also referred to as a first ring in the present embodiment) of a bearing in an interference fit manner, the framework 10 and the inner ring do not rotate relative to each other, the sealing component 20 is configured to abut against an outer ring (also referred to as a second ring in the present embodiment) of the bearing, and the sealing component 20 is rotatable relative to the outer ring.

In the present embodiment, the elastic members 40 are further provided with several (two in the present embodiment) positioning holes 42 except for through holes 41 for rubber to pass through. The positioning holes 42 are used to align positioning pins on a vulcanization mold in the vulcanization process of connecting the elastic members 40 to the sealing component 20, so as to ensure the positioning accuracy of the elastic members 40 on the sealing component 20.

It should be understood that some aspects or features of the above-mentioned embodiments may be properly combined.

It should be understood that the present disclosure further provides a bearing comprising the above-mentioned sealing device S. Preferably, the bearing has a diameter of 1 meter to several meters. Preferably, the bearing is a bearing used for a main shaft of a wind power generator.

Some of the beneficial effects of the above-mentioned embodiments of the present disclosure are briefly described hereinafter.

(i) A plurality of C-shaped elastic members 40 uniformly provide radial forces to abut against the second ring of the bearing for the sealing component 20 at different positions in the circumferential direction, so that the sealing component 20 can be in close contact with the second ring, and the sealing device S has a good sealing effect.

(ii) The rubber-overflowing holes (through holes 41) on the elastic members 40 allow the sealing component 20 made of, for example, rubber to partially pass through, and the elastic members 40 and the sealing component 20 are connected firmly.

(iii) The bellmouth-shaped oil-pumping grooves 23 can effectively pump lubricant near the main lip 21 to the inner side of the bearing, and the lubricant is not easy to leak.

(iv) The additional lip 30 can prevent external pollutants from entering the inner side of the bearing, and meanwhile, protect the auxiliary lip 22 from being easily torn or worn, and the good air permeability and water resistance of the additional lip 30 enable pressures on two axial sides of the auxiliary lip 22 to be balanced.

It should be understood that the above-mentioned embodiments are exemplary only and are not intended to limit the present disclosure. Those skilled in the art can make various modifications and changes to the above-mentioned embodiments according to the teaching of the present disclosure without departing from the scope of the present disclosure. For example, (i) Although an inner ring of a main shaft bearing of a wind power generator is usually a rotating ring and an outer ring is a fixed ring, the present disclosure does not limit the working status of the inner ring and the outer ring of the bearing. For example, in the two above-mentioned embodiments, any one of the inner ring and the outer ring may be a rotating ring, and the other one may be a fixed ring.

(ii) The present disclosure does not limit shapes and quantities of the through holes 41 and the positioning holes 42 of the elastic members 40. For example, the through holes 41 may be circular, square or of other shapes.

(iii) The elastic members 40 of the present invention may also not be C-shaped, but for example, L-shaped or Z-shaped, or the elastic member 40 comprises at least two areas that are bent to each other. When the sealing device is mounted on the bearing, the elastic members 40 are in a compressed state, so that the elastic members 40 can apply an elastic force to the sealing component 20 such that the sealing component 20 is pressed against the second ring Referring to FIG. 5, for example, under the circumstance that the elastic member is substantially L-shaped, the elastic member may comprise a first bending sheet 401 and a second folding sheet 402, as shown in FIG. 5.

LIST OF REFERENCE NUMERALS

B1 outer ring;
B2 inner ring;
S1 framework;
S2 sealing component;
S3 spring;
S21 main lip;
S22 auxiliary lip;
f inclined surface;
S sealing device;
10 framework;
20 sealing component;
21 main lip;
22 auxiliary lip;
23 oil-pumping groove;
231 first face;
232 second face;
233 third face;
234 fourth face;
30 additional lip;
40 elastic member;
41 through hole;
42 positioning hole;
A axial direction;
R radial direction.

The invention claimed is:

1. A sealing device of a bearing, the sealing device comprising:
a framework;
a sealing component and a plurality of elastic members, the framework and the sealing component are both annular and connected to each other;
the framework is configured to be fixed to a first ring of the bearing;
the sealing component is configured to abut against a second ring of the bearing, the plurality of elastic members are distributed at intervals in a circumferential direction of the sealing component, and the elastic members apply an elastic force to the sealing component such that the sealing component is pressed against the second ring;
wherein a plurality of through holes are formed in each of the elastic members, and the sealing component partially passes through the plurality of through holes.

2. The sealing device according to claim 1, wherein, the elastic members includes a first section, second section, and third section, with each of the sections being connected by a curved portion.

3. The sealing device according to claim 1, wherein the framework comprises fabric.

4. The sealing device according to claim 1, wherein the sealing component comprises rubber.

5. The sealing device according to claim 4, wherein, the sealing component and the elastic members are connected together by a vulcanization process.

6. The sealing device according to claim 1, wherein the plurality of through holes comprises three through holes.

7. The sealing device according to claim 1, wherein a plurality of positioning holes are formed on each of the elastic members, and the plurality of positioning holes are adapted to cooperate with positioning devices on a mold to determine circumferential positions of the elastic members on the sealing component.

8. The sealing device according to claim 1, wherein a face of the sealing component, for facing the second ring and an inner side area of the bearing, is partially recessed towards an outer side of the sealing device to form a plurality of oil-pumping grooves, and the plurality of oil-pumping grooves are distributed in the circumferential direction of the sealing component.

9. The sealing device according to claim 8, wherein openings of the oil-pumping grooves are larger toward an inner side of the bearing than an outer side.

10. The sealing device according to claim 1, wherein the sealing component comprises a main lip and an auxiliary lip, the main lip inclines towards one side in an axial direction of the sealing component, the auxiliary lip inclines towards an other side in the axial direction, the main lip is adapted to face the inner side of the bearing, and the auxiliary lip is adapted to face an outer side of the bearing.

11. The sealing device according to claim 10, wherein the main lip is adapted to be in contact with the second ring.

12. The sealing device according to claim 10, further comprising an additional lip configured to face an outer side of the bearing and be in contact with the second ring, and the additional lip is formed of air permeable material.

13. The sealing device according to claim 10, wherein the auxiliary lip is further provided with an additional lip that is adapted to be in contact with the second ring, and the additional lip is comprised of felt.

14. The sealing device according to claim 1, wherein an inner diameter of the framework is not less than 1 meter.

15. A bearing, comprising:
a first ring and a second ring that are nested with each other and are rotatable relative to each other, and
a sealing device comprising:
  a framework;
  a sealing component and a plurality of elastic members, the framework and the sealing component are both annular and connected to each other;
  the framework is configured to be fixed to a first ring of the bearing; and
  the sealing component is configured to abut against a second ring of the bearing, the plurality of elastic members are distributed at intervals in a circumferential direction of the sealing component, and the elastic members apply an elastic force to the sealing component such that the sealing component is pressed against the second ring;
  wherein a plurality of through holes are formed in each of the elastic members, and the sealing component partially passes through the plurality of through holes.

16. The bearing according to claim 15, wherein the bearing is a main shaft bearing of a wind power generator.

17. A sealing device of a bearing, the sealing device comprising:
  a framework;
  a sealing component and a plurality of elastic members;
  the framework and the sealing component are both annular and connected to each other;
  the framework is configured to be fixed to a first ring of the bearing;
  the sealing component is configured to abut against a second ring of the bearing;
  the plurality of elastic members are distributed at intervals in a circumferential direction of the sealing component;
  the elastic members apply an elastic force to the sealing component such that the sealing component is adapted to be pressed against the second ring; and
  a face of the sealing component, for facing the second ring, includes a plurality of oil pumping grooves
  wherein a plurality of positioning holes are formed on each of the elastic members, and the plurality of positioning holes are adapted to cooperate with positioning devices on a mold to determine circumferential positions of the elastic members on the sealing component.

18. The sealing device of claim 17, wherein openings of the oil-pumping grooves are larger toward an inner side of the bearing than an outer side.

19. The sealing device of claim 18, wherein the sealing component comprises a main lip and an auxiliary lip, the main lip inclines towards one side in an axial direction of the sealing component, the auxiliary lip inclines towards an other side in the axial direction, the main lip is adapted to face the inner side of the bearing, and the auxiliary lip is adapted to face an outer side of the bearing.

20. The sealing device of claim 19, further comprising an additional lip configured to face an outer side of the bearing and be in contact with the second ring, and the additional lip is formed of air permeable material.

\* \* \* \* \*